(12) United States Patent
Shimasaki (10) Patent No.: US 6,299,563 B1
(45) Date of Patent: Oct. 9, 2001

(54) CONTROL SYSTEM FOR HYBRID VEHICLE (75) Inventor: Yuichi Shimasaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/511,190

(22) Filed: Feb. 23, 2000

(30) Foreign Application Priority Data

Feb. 23, 1999 (JP) .................................................. 11-44607

(51) Int. Cl.[7] .................................................. B60K 41/00
(52) U.S. Cl. .................................................. 477/5; 477/3
(58) Field of Search .................................. 477/3, 5, 169, 477/174, 175; 180/65.2

(56) References Cited

U.S. PATENT DOCUMENTS

| | | | |
|---|---|---|---|
| 5,337,848 | * 8/1994 | Bader | 180/65.2 |
| 5,713,425 | * 2/1998 | Buschhaus et al. | 180/65.2 |
| 5,993,350 | * 11/1999 | Lawrie et al. | 477/5 |
| 6,019,183 | 2/2000 | Shimasaki et al. | 180/165 |
| 6,020,697 | 2/2000 | Shimasaki et al. | 318/140 |
| 6,022,290 | * 2/2000 | Lyon | 180/65.2 X |
| 6,159,127 | * 12/2000 | Loeffler et al. | 477/5 |

\* cited by examiner

*Primary Examiner*—Charles A Marmor
*Assistant Examiner*—Ankur Parekh
(74) *Attorney, Agent, or Firm*—Armstrong, Westerman, Hattori, McLeland & Naughton, LLP (57) ABSTRACT

An input drive power applied to an automatic transmission is sequentially recognized. When there is a demand for the automatic transmission to make a gear shift, a clutch mechanism is disengaged, and a drive power generated by an electric motor connected to the automatic transmission at an output side of the clutch mechanism is controlled depending on the input drive power (input drive power immediately prior to a gear shift) that is applied to the automatic transmission immediately before the clutch mechanism starts to be disengaged. The drive power generated by the electric motor is controlled such that a drive power equivalent to the input drive power immediately prior to a gear shift is applied from the electric motor to the automatic transmission.

7 Claims, 7 Drawing Sheets

CONTROL SYSTEM FOR HYBRID VEHICLE

BACKGROUND OF THE INVENTION

1. Field of the Invention

The present invention relates to a control system for controlling a parallel hybrid vehicle.

2. Description of the Related Art

Some parallel hybrid vehicles have an internal combustion engine as a primary propulsive power unit and an electric motor for generating an assistive output power for assisting the output power produced by the engine. The output powers (mechanical powers) generated by the engine and the electric motor are transmitted through a power transmitting mechanism including a transmission to drive wheels of the hybrid vehicle.

For accelerating the hybrid vehicle, the electric motor is controlled to generate an assistive output power, and both the output power produced by the engine and the assistive output power from the electric motor are transmitted to the drive wheels. Therefore, the power requirements for accelerating the hybrid vehicle can be met, and the output power produced by the engine may be relatively small, thus reducing fuel consumption by the engine and exhaust gases emitted from the engine.

The electric motor usually comprises a generator motor that can operate also as an electric generator. While the hybrid vehicle is decelerating, the electric motor is operated as an electric generator to regenerate electric energy by the kinetic energy of the hybrid vehicle which is transmitted from the drive wheels through the power transmitting mechanism to the electric motor. The regenerated electric energy is stored in an electric energy storage unit such as a battery used as a power supply for the electric motor. Such an operation is referred to as a regenerative mode of the electric motor.

The transmission of the power transmitting mechanism may comprise an automatic transmission with a torque converter which does not require a clutch between the transmission and the output shaft of the engine or an automatic transmission which requires a clutch between itself and the output shaft of the engine and which is controlled by an actuator.

On a hybrid vehicle with the automatic transmission combined with the clutch, the actuator automatically controls not only the automatic transmission for gear shifts, but also the clutch for engagement and disengagement.

While the hybrid vehicle is running, if the automatic transmission needs to make a gear shift based on a predetermined transmission control map in response to a shift lever operation made by the driver and operating conditions of the hybrid vehicle, then the clutch is disengaged. After the clutch is disengaged, the automatic transmission needs makes the desired gear shift. Then, the clutch is engaged again.

On the above hybrid vehicle, the electric motor may be connected to either the output shaft of the engine at the input side of the clutch or the transmission at the output side of the clutch.

For the automatic transmission to make a gear shift, the clutch is disengaged temporarily. Upon disengagement of the clutch, since no output power of the engine is transmitted to the drive wheels of the hybrid vehicle, the hybrid vehicle runs only under inertial forces. Therefore, when the clutch is disengaged for the automatic transmission to make a gear shift, the driver of the hybrid vehicle feels that the vehicle runs idly.

To avoid such a drawback, it has been customary to control the automatic transmission to make a gear shift as quickly as possible and keep the clutch disengaged as shortly as possible or to engage the clutch as quickly as possible from a disengaged state, i.e., to make a partly engaged state of the clutch as short as possible.

However, there is a certain limitation on efforts to keep the clutch disengaged as shortly as possible. Even if the period of disengagement of the clutch is shortened, only the period of time in which the driver feels that the hybrid vehicle runs idly can be shortened, and such a driver's feeling cannot fully be eliminated.

Furthermore, when the clutch is engaged quickly, the clutch tends to produce a large shock which may be transmitted to the driver. The large shock thus generated may also possibly place an undue burden on the synchromesh mechanism of the automatic transmission, which is liable to be reduced in durability.

SUMMARY OF THE INVENTION

It is therefore an object of the present invention to provide a control system for controlling a hybrid vehicle having an automatic transmission which requires a clutch between itself and an engine, so as to eliminate an idly running state and a shock when the automatic transmission makes a gear shift.

To achieve the above object, there is provided in accordance with the present invention a control system for controlling a hybrid vehicle having an engine for propelling the hybrid vehicle, the engine having an output shaft, an automatic transmission connected to the output shaft of the engine for transmitting an output power of the engine to drive wheels of the hybrid vehicle, clutch means connected between the output shaft of the engine and the automatic transmission, for selectively applying the output power of the engine to the automatic transmission, an electric motor connected to the automatic transmission at an outside side of the clutch means for transmitting an assistive output power for assisting the output power of the engine via the automatic transmission to the drive wheels, clutch control means for successively disengaging and engaging the clutch means in response to a demand for the automatic transmission to make a gear shift, and transmission control means for controlling the automatic transmission to make a gear shift when the clutch means is disengaged, the control system comprising drive power recognizing means for recognizing a drive power applied to the automatic transmission immediately before the clutch means starts being disengaged when there is a demand for the automatic transmission to make a gear shift, and motor control means for controlling a drive power generated by the electric motor to apply a drive power which is substantially equal to the drive power recognized by the drive power recognizing means, from the electric motor to the automatic transmission when the clutch means is disengaged.

With above arrangement, when there is a demand for the automatic transmission to make a gear shift, the drive power recognizing means recognizes a drive power applied to the automatic transmission immediately before the clutch means starts being disengaged. The clutch control means disengages the clutch means into the disengaged state, and the transmission control means controls the automatic transmission to make the desired gear shift while the clutch means is in the disengaged state. After the gear shift is made, the clutch control means engages the clutch means back into the engaged state.

At this time, the electric motor is controlled by the motor control means to generate a drive power which is substantially equal to the drive power recognized by the drive power recognizing means, i.e., the drive power applied to the automatic transmission immediately before the clutch means is disengaged.

Therefore, the automatic transmission is given the drive power equivalent to the drive power prior to the disengagement of the clutch means even when the clutch means is in the disengaged state, and the drive power given to the automatic transmission is transmitted to the drive wheels of the hybrid vehicle. The driver of the hybrid vehicle is thus prevented from feeling that the hybrid vehicle runs idly when the clutch means is in the disengaged state at the time the automatic transmission makes the gear shift.

Preferably, the control system further comprises detecting means for detecting an operated position intermediate between disengaged and engaged states of the clutch means, and the motor control means comprise means for controlling the drive power generated by the electric motor depending on the operated position of the clutch means so as to be smaller than the drive power generated by the electric motor when the clutch means is disengaged, as the operated position of the clutch means detected by the detecting means approaches the engaged state of the clutch means.

Specifically, when the clutch means is in an operated position intermediate between disengaged and engaged states, i.e., the clutch means is partly engaged, the drive power applied from the engine to the automatic transmission varies depending on the operated position of the clutch means, more specifically, the displacement of the friction plate of the clutch means, for example. For example, when the clutch means is in an intermediate state in a process from the disengaged state to the engaged state of the clutch means, the drive power applied from the engine to the automatic transmission increases as the engagement of the clutch means proceeds. According to the present invention, the motor control means controls the drive power generated by the electric motor depending on the operated position of the clutch means so as to be smaller than the drive power generated by the electric motor when the clutch means is disengaged, as the operated position of the clutch means detected by the detecting means approaches the engaged state of the clutch means. In this manner, even when the clutch means is in the disengaged state, or even when the clutch means is in the intermediate state (partly engaged) while being disengaged or engaged, it is possible to apply the drive power substantially equal to the drive power recognized by the drive power recognizing means to the automatic transmission. Accordingly, over an entire period of operation of the clutch means from the start of disengagement of the clutch means to the end of engagement thereof, the drive power applied to the automatic transmission is constant to reliably prevent the driver of the hybrid vehicle from feeling that the hybrid vehicle runs idly. Shocks produced when the clutch means is engaged are reduced, and the automatic transmission is allowed to make gear shifts smoothly.

Since the drive power applied to the automatic transmission is constant even when the clutch means is in the intermediate state while being disengaged or engaged, the period of time required to disengage or engage the clutch means can be established with increased freedom. While the clutch means should be disengaged quickly, it is preferable to engage the clutch means over a period of time depending on the driving conditions of the hybrid vehicle.

For example, in a situation where the hybrid vehicle is to be accelerated for a much higher speed or accelerated and decelerated frequently, the clutch means should preferably be engaged in a short period of time in order to obtain highly responsive running behaviors of the hybrid vehicle. In a situation where the hybrid vehicle is cruising at a substantially constant speed, however, the clutch means should preferably be engaged in a longer period of time in order to reduce shocks produced when the clutch means is engaged and lower undue burdens on the synchromesh mechanism of the automatic transmission.

In controlling the drive power of the electric motor depending on the operated position of the clutch means, the control system further comprises engagement time setting means for setting a time required to engage the clutch means from the disengaged state into the engaged state, depending on at least one of the drive power recognized by the drive power recognizing means, a rotational speed of the engine prior to the demand for the automatic transmission to make a gear shift, a speed reduction ratio of the automatic transmission prior to the demand for the automatic transmission to make a gear shift, and a demanded running pattern of the hybrid vehicle prior to the demand for the automatic transmission to make a gear shift, the clutch control means comprising means for engaging the clutch means for the time after the clutch means has been disengaged.

The above arrangement allows the clutch means to be engaged in a manner suited to the driving conditions and running situations of the hybrid vehicle.

The time required to engage the clutch means depending on the drive power recognized by the drive power recognizing means or the rotational speed of the engine prior to the demand for the automatic transmission to make a gear shift should preferably be longer as the drive power or the rotational speed is lower. This is because when the drive power or the rotational speed is lower, it is highly possible for the hybrid vehicle to be cruising at a substantially constant speed or running in a nearly cruising fashion, and, in such a situation, the time required to engage the clutch means should preferably be longer in order to reduce shocks produced when the clutch means is engaged and lower undue burdens on the synchromesh mechanism of the automatic transmission. When the drive power or the rotational speed is higher, it is highly possible for the hybrid vehicle to be running with large acceleration or frequency acceleration and deceleration, and, in such a situation, the time required to engage the clutch means should preferably be shorter in order to obtain highly responsive running behaviors of the hybrid vehicle.

The time required to engage the clutch means depending on the speed reduction ratio of the automatic transmission prior to the demand for the automatic transmission to make a gear shift should preferably be longer as the speed reduction ratio is for a higher speed. This is because when the speed reduction ratio is for a higher speed, it is highly possible for the hybrid vehicle to be cruising at a substantially constant speed or running in a nearly cruising fashion, and, in such a situation, the time required to engage the clutch means should preferably be longer, as described above. When the speed reduction ratio is for a lower speed, it is highly possible for the hybrid vehicle to be running with large acceleration or frequency acceleration and deceleration, and, in such a situation, the time required to engage the clutch means should preferably be shorter, as described above.

The time required to engage the clutch means depending on the demanded running pattern of the hybrid vehicle prior to the demand for the automatic transmission to make a gear shift should preferably be longer in a situation where the hybrid vehicle is to cruise at a substantially constant speed or run in a nearly cruising fashion, and shorter in a situation where the hybrid vehicle is to run with large acceleration or frequency acceleration and deceleration. The demanded running pattern of the hybrid vehicle can be recognized on the basis of the accelerator operated quantity of the hybrid vehicle, or the magnitude, change, or rate of change of the opening of the throttle valve of the engine depending on the accelerator operated quantity.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
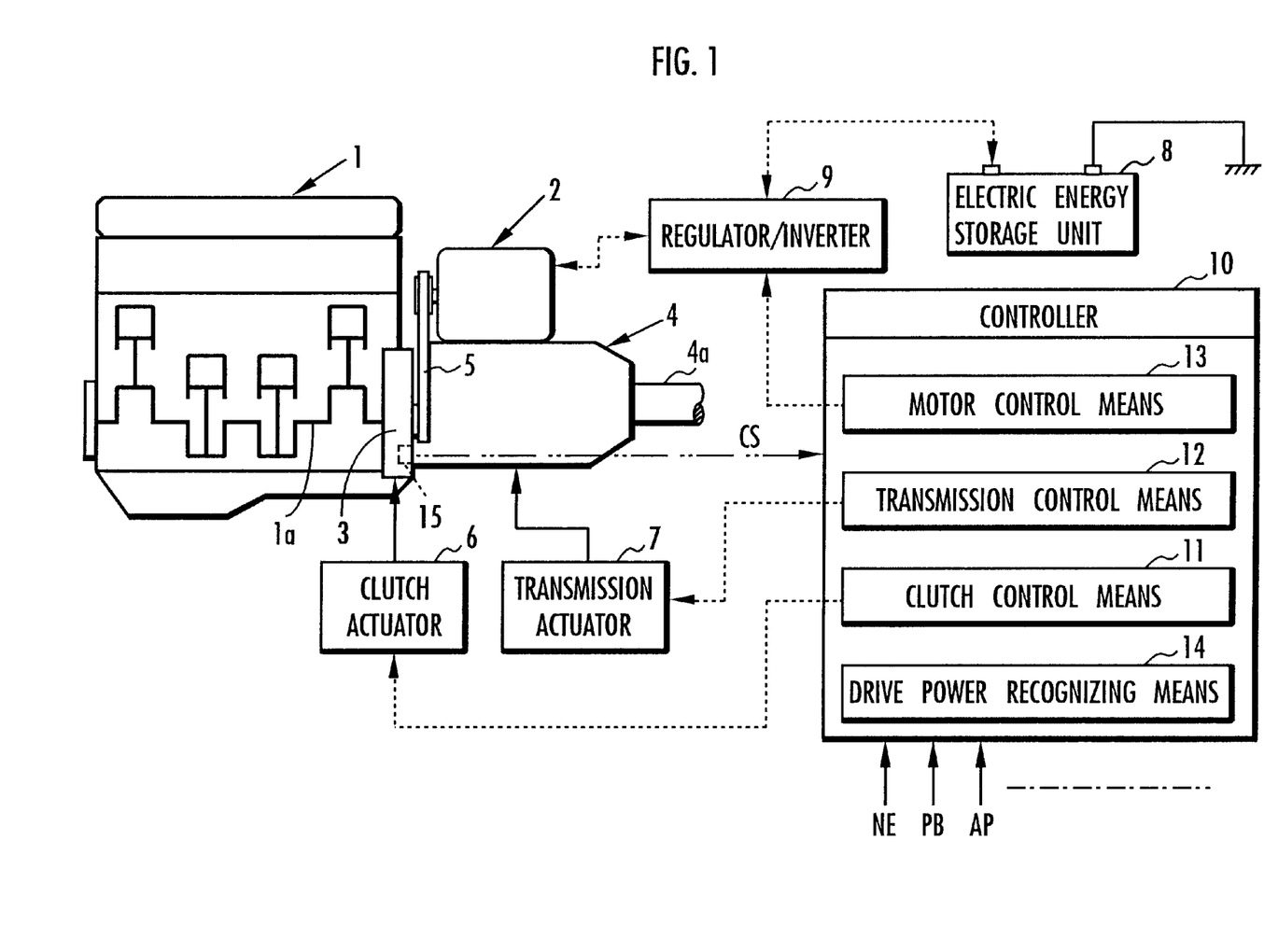
FIG. 1 is a block diagram of a system arrangement of a hybrid vehicle according to first and second embodiments of the present invention.

As shown in FIG. 1, a parallel hybrid vehicle according to first and second embodiments of the present invention has an internal combustion engine 1, an electric motor 2 (more specifically, a generator motor that can operate also as an electric generator), a clutch mechanism 3 (clutch means), and an automatic transmission 4.

The engine 1 serves as a primary propulsive power unit of the hybrid vehicle, and has a crankshaft 1a as an output shaft coupled through the clutch mechanism 3 disconnectably to an input shaft of the automatic transmission 4 whose output drive shaft 4a is operatively connected to drive wheels of the hybrid vehicle through a differential gear mechanism (not shown). The electric motor 2 has a rotor (not shown) connected to the input shaft of the automatic transmission 4 by a rotation transmitting means 5 at the output side of the clutch mechanism 3. The rotation transmitting means 5 comprises a gear/chain mechanism, a pulley/belt mechanism, or a gear mechanism, for example.

When the clutch mechanism 3 is engaged, the output power of the engine 1 is transmitted via the clutch mechanism 3 and the automatic transmission 4 to the drive wheels of the hybrid vehicle to propel the hybrid vehicle. When the assistive output power (rotational drive power) for assisting the output power of the engine 1 is generated by the electric motor 2, the generated assistive output power and the output power of the engine 1 are transmitted via the automatic transmission 4 to the drive wheels of the hybrid vehicle.

The clutch mechanism 3 is of the frictionally engageable type, and can be engaged and disengaged when its clutch plate is displaced by a hydraulic clutch actuator 6.

The automatic transmission 4 is free of any torque converter, and can make a gear shift when its transmission mechanism is operated by a hydraulic transmission actuator 7 while the clutch mechanism 3 is being disengaged.

The hybrid vehicle has, in addition to the above mechanism structural details, an electric arrangement as follows:

The hybrid vehicle includes an electric energy storage unit 8 for storing electric energy as a power supply for operating the electric motor 2, a regulator/inverter 9 for transmitting electric energy between the electric energy storage unit 8 and the electric motor 2, and a controller 10 comprising a microcomputer or the like.

The controller 10 is supplied with various detected data indicative of a vehicle speed V of the hybrid vehicle, a rotational speed NE and an intake pressure PB of the engine 1, an operated quantity (AP) of the accelerator pedal (not shown) of the hybrid vehicle, from corresponding sensors (not shown).

The controller 10 has, as functions related to the present invention, a clutch control means 11 for controlling engagement and disengagement of the clutch mechanism 3, a transmission control means 12 for controlling gear shifting operation of the automatic transmission 4, a motor control means 13 for controlling operation of the electric motor 2, and a drive power recognizing means 14 for recognizing a drive power (torque) applied to the automatic transmission 4.

The clutch control means 11 functions to control the clutch actuator 6 to successively engage and disengage the clutch mechanism 3 when there is a demand for the automatic transmission 4 to make a gear shift.

The transmission control means 12 functions to control the transmission actuator 7 to cause the automatic transmission 4 to make a gear shift while the clutch mechanism 3 is being disengaged in response to the demand for the automatic transmission 4 to make the gear shift.

The controller 10 has a transmission control map (not shown) which defines times to make gear shifts with the automatic transmission 4 and speed reduction ratios (1st through 5th gear positions) to be achieved by the gear shifts of the automatic transmission 4, depending on the vehicle speed V, the rotational speed NE of the engine 1, and the accelerator operated quantity AP. The controller 10 recognizes whether there is a demand for the demand for the automatic transmission 4 to make a gear shift and a speed reduction ratio to be achieved by the gear shift, based on the transmission control map from detected data of the vehicle speed V, the rotational speed NE of the engine 1, and the accelerator operated quantity AP.

The motor control means 13 functions to control operation of the electric motor 2 via the regulator/inverter 9 in order to enable the electric motor 2 to generate a desired drive power with electric energy supplied from the electric energy storage unit 8 while the clutch mechanism 3 is being engaged and disengaged upon a gear shift performed by the automatic transmission 4. As described in detail later on, the desired drive power to be generated by the electric motor 2 is determined depending on the drive power (recognized by the drive power recognizing means 14 as described later on) which is applied to the automatic transmission 4 immediately before the clutch mechanism 3 is disengaged in response to a demand for the automatic transmission 4 to make a gear shift.

The motor control means 13 also functions to control operation of the electric motor 2 via the regulator/inverter 9 in order to enable the electric motor 2 to generate a desired assistive output power with electric energy supplied from the electric energy storage unit 8 when the hybrid vehicle is accelerated (with the clutch mechanism 3 engaged). Furthermore, the motor control means 13 also functions to control operation of the electric motor 2 via the regulator/inverter 9 in order to operate the electric motor 2, to which the kinetic energy of the hybrid vehicle is applied via the automatic transmission 4, as the electric generator to regenerate electric energy, and charge the electric energy storage unit 1 with the regenerated electric energy, when the hybrid vehicle is accelerated (with the clutch mechanism 3 engaged), for example.

The drive power recognizing means 14 has a function to sequentially recognize a drive power applied to the automatic transmission 4 (hereinafter referred to as an "input drive power") with the clutch mechanism 3 engaged while the hybrid vehicle is running. When there is a demand for the automatic transmission 4 to make a gear shift, the drive power recognizing means 14 supplies the input drive power immediately before the clutch mechanism 3 starts being disengaged based on the demand, to the motor control means 13 for controlling operation of the electric motor 2.

The input drive power recognized by the drive power recognizing means 14 is basically a drive power applied from the engine 1 via the clutch mechanism 3 to the automatic transmission 4, i.e., a drive power outputted by the engine 1. However, the drive power which is recognized by the drive power recognizing means 14 while the electric motor 2 is generating an assistive output power when the hybrid vehicle is accelerated is the sum of a drive power applied from the engine 1 to the automatic transmission 4 and a drive power applied from the electric motor 2 via the rotation transmitting means 5 to the automatic transmission 4.

The drive power recognizing means 14 recognizes a drive power applied from the engine 1 to the automatic transmission 4, i.e., a drive power outputted by the engine 1, based on a predetermined map or the like from the rotational speed NE and the intake pressure PB of the engine 1. The drive power recognizing means 14 calculates a drive power applied from the electric motor 2 to the automatic transmission 4 while the electric motor 2 is generating an assistive output power, from a target assistive output power set for the electric motor when the motor control means 13 controls the electric motor 2 to generate an assistive output power, or a target value for a torque generated by the electric motor 2, which target value is determined depending on the target assistive output power, and the speed reduction ratio of the automatic transmission 4, according to a predetermined equation.

The input drive power applied to the automatic transmission 4 and recognized by the drive power recognizing means 14 immediately before the clutch mechanism 3 starts being disengaged based on a demand for the automatic transmission 4 to make a gear shift may also be referred to as an "input drive power immediately prior to a gear shift".

FIG. 1 also shows a sensor 15 which is employed according to a second embodiment described later on, but not in the present embodiment.

Operation of the hybrid vehicle, particularly in connection with a gear shifting operation of the automatic transmission 4, according to the present embodiment will be described below.

Figure 2:
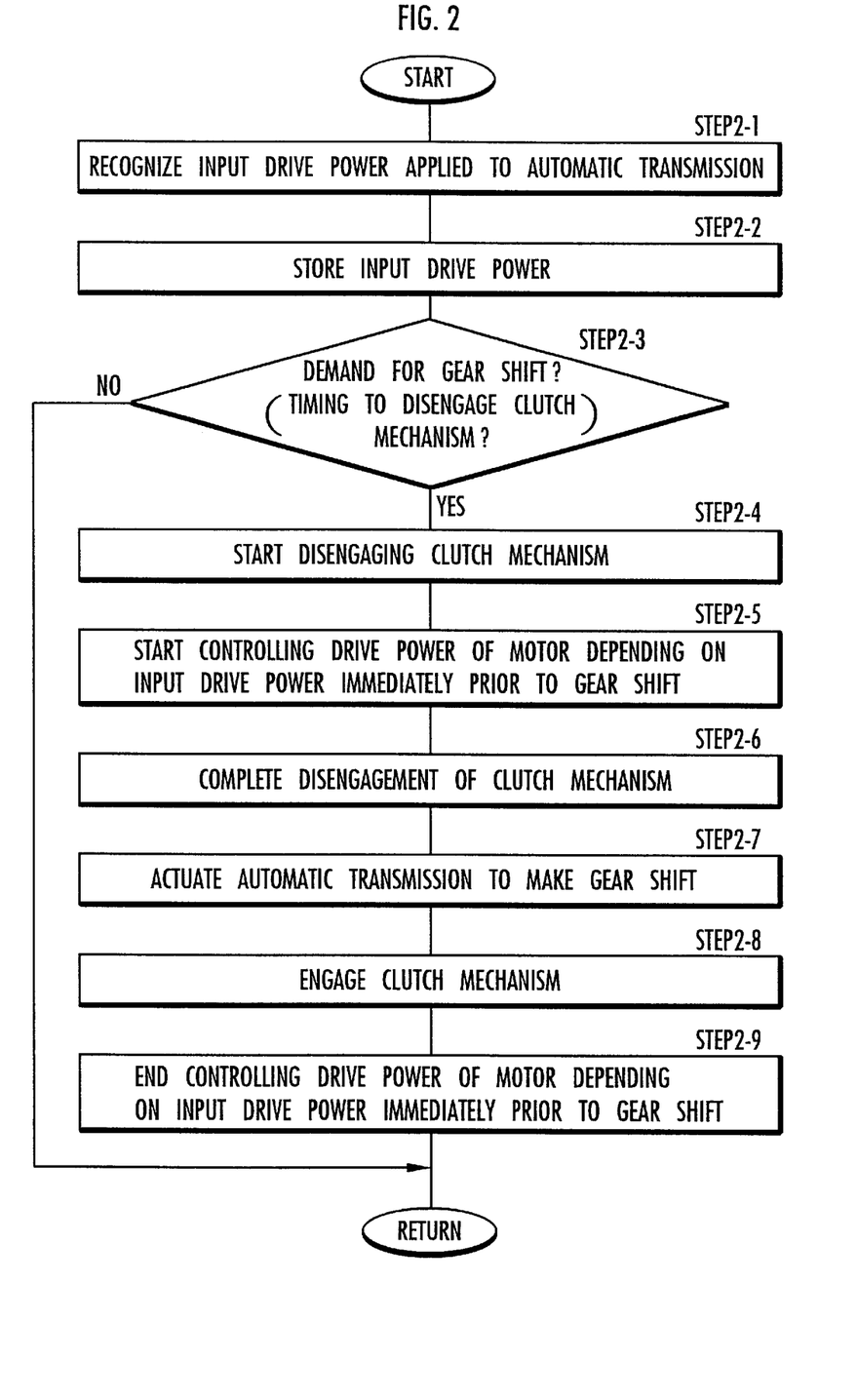
FIG. 2 a flowchart of an operation sequence of the hybrid vehicle according to the first embodiment of the present invention.

As shown in FIG. 2, while the hybrid vehicle is running, the drive power recognizing means 14 sequentially recognizes an input drive power applied to the automatic transmission 4 in STEP2-1, and stores the recognized input drive power in a memory (not shown) in STEP2-2. The input drive power recognized by the drive power recognizing means 14 is usually the drive power (drive power outputted by the engine 1) applied from the engine 1 via the clutch mechanism 3 to the automatic transmission 4. While the electric motor 2 is generating an assistive output power, the input drive power recognized by the drive power recognizing means 14 is the sum of the drive power applied from the engine 1 and the drive power applied from the electric motor 2 via the rotation transmitting means 5 to the automatic transmission 4.

While recognizing and storing the input drive power applied to the automatic transmission 4, the controller 10 determines, based on the transmission control map, whether there is a demand for the automatic transmission 4 to make a gear shift or not, i.e., whether it is a time to disengage the clutch mechanism 3 for the automatic transmission 4 to make a gear shift or not, in STEP2-3.

If there is no demand for the automatic transmission 4 to make a gear shift, then the processing in STEP2-1, STEP2-2 is repeated. If there is a demand for the automatic transmission 4 to make a gear shift, then the clutch control means 11 causes the clutch actuator 6 to start disengaging the clutch mechanism 3 in STEP2-4.

Thereafter, the motor control means 13 starts controlling a drive power of the electric motor 2 depending on the input drive power applied to the automatic transmission which is stored as the latest input drive power in STEP2-2, i.e., the input drive power (the input drive power immediately prior to a gear shift) recognized by the drive power recognizing means 14 immediately before the clutch mechanism 3 starts being disengaged, in STEP2-5.

More specifically, a target drive power to be generated by the electric motor 2 is determined from the input drive power immediately prior to a gear shift and the speed reduction ratio of the rotation transmitting means 5. The target drive power is such a drive power of the electric motor 2 that the drive power applied from the electric motor 2 via the rotation transmitting means 5 to the automatic transmission 4 is equal to the input drive power immediately prior to a gear shift. The electric energy supplied from the electric energy storage unit 8 to the electric motor 2 in order to enable the electric motor 2 to generate the target drive power is controlled by the regulator/inverter 9.

In STEP2-5, specifically, operation of the electric motor 2 is controlled by the regulator/inverter 9 so that the drive power (constant) equal to the input drive power immediately prior to a gear shift is applied from the electric motor 2 to the automatic transmission 4.

While the drive power of the electric motor 2 is being thus controlled, when the disengagement of the clutch mechanism 3 is completed, i.e., when the clutch mechanism 3 is disengaged in STEP2-6, the transmission control means 12 controls the transmission actuator 7 to actuate the automatic transmission 4 to make a gear shift, i.e., to change speed reduction ratios, according to the transmission control map, in STEP2-7.

After the automatic transmission 4 has made a gear shift, the clutch control means 11 controls the clutch actuator 6 to engage the clutch mechanism 3 in STEP2-8. Then, the above controlling of the drive power of the electric motor 2 depending on the input drive power immediately prior to a gear shift is ended in STEP2-9.

After the engagement of the clutch mechanism 3 has been completed, the electric motor 2 is controlled to generate an assistive output power or regenerate electric energy depending on how the hybrid vehicle runs.

When the clutch mechanism 3 is disengaged with no drive power applied from the engine 1 to the automatic transmission 3 in the operation of the hybrid vehicle in connection with a gear shifting operation of the automatic transmission 4, a drive power equivalent to the input drive power which is applied to the automatic transmission 4 immediately before the clutch mechanism 3 starts being disengaged (the input drive power immediately prior to a gear shift) is applied from the electric motor 2 to the automatic transmission 4.

It is assumed that the hybrid vehicle is running with only the output power from the engine 1 before a demand for the automatic transmission 4 to make a gear shift is produced. When the clutch mechanism 3 is disengaged in response to a demand for the automatic transmission 4 to make a gear shift, the input drive power applied from the engine 1 to the automatic transmission 4 drops to "0" as indicated by the solid-line curve "a" in FIG. 3. At this time, an input drive power that makes up for the dropping input drive power applied from the engine 1 to the automatic transmission 4 is applied from the electric motor 2 to the automatic transmission 4 as indicated by the solid-line curve "b" in FIG. 3.

Figure 3:
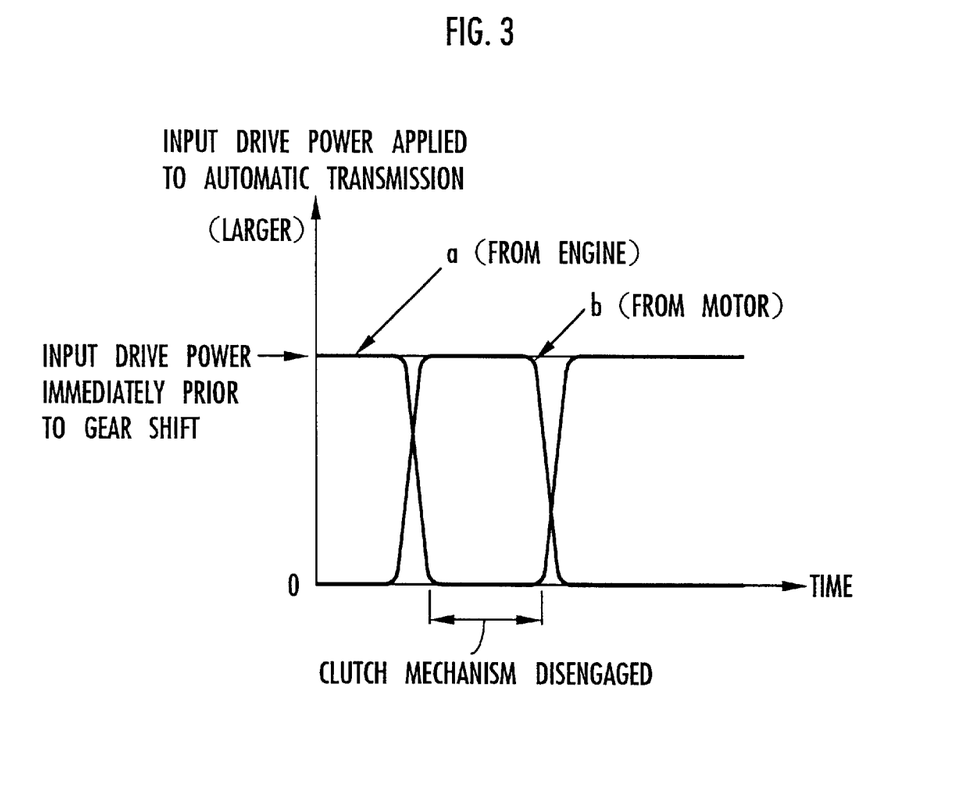
FIG. 3 is a diagram illustrative of the manner in which the hybrid vehicle operates according to the first embodiment of the present invention.

Therefore, even though the clutch mechanism 3 is disengaged for the automatic transmission 4 to make a gear shift, the propulsive drive power is transmitted to the drive wheels of the hybrid vehicle as if the clutch mechanism 3 remained engaged. As a result, the driver of the hybrid vehicle is prevented from feeling that the vehicle runs idly, the feeling which has heretofore been caused when the clutch mechanism is disengaged.

A hybrid vehicle according to a second embodiment of the present invention will be described below with reference to FIGS. 1 and 4 through 10.

The hybrid vehicle according to the second embodiment is basically of the same arrangement as the hybrid vehicle according to the first embodiment. Those parts of the hybrid vehicle according to the second embodiment which are identical to those of the hybrid vehicle according to the first embodiment are denoted by identical reference characters, and will not be described in detail below.

In FIG. 1, the hybrid vehicle according to the second embodiment has a clutch sensor 15 (detecting means) associated with the clutch mechanism 3 for detecting a displacement CS (hereinafter referred to as a "clutch stroke CS") of the clutch plate (not shown) as representing an operative position of the clutch mechanism 3. The clutch sensor 15 sends data representative of the detected clutch stroke CS to the controller 10.

According to the second embodiment, the controller 10 has an additional function to be performed by the clutch control means 11. Specifically, the clutch control means 11 has a function to establish a time required to return the clutch mechanism 3 from a disengaged state to an engaged state (hereinafter referred to as a "clutch engagement time") depending on the rotational speed NE of the engine 1, etc., and engaging the clutch mechanism 3 according to the established clutch engagement time. Therefore, the clutch control means 11 functions as an engagement time setting means.

The motor control means 13 has a function to control a drive power to be generated by the electric motor 2 depending on the input drive power immediately prior to a gear shift and the clutch stroke CS detected by the clutch sensor 15, when the clutch mechanism 3 is engaged and disengaged for the automatic transmission 4 to make a gear shift.

According to the second embodiment, the controller 10 also has a function to recognize a running mode required for the hybrid vehicle based on the accelerator operated quantity AP, as described in detail later on.

Other structural details and functions of the hybrid vehicle according to the second embodiment are the same as those of the hybrid vehicle according to the first embodiment.

Operation of the hybrid vehicle, particularly in connection with a gear shifting operation of the automatic transmission 4, according to the second embodiment will be described below.

Figure 4:
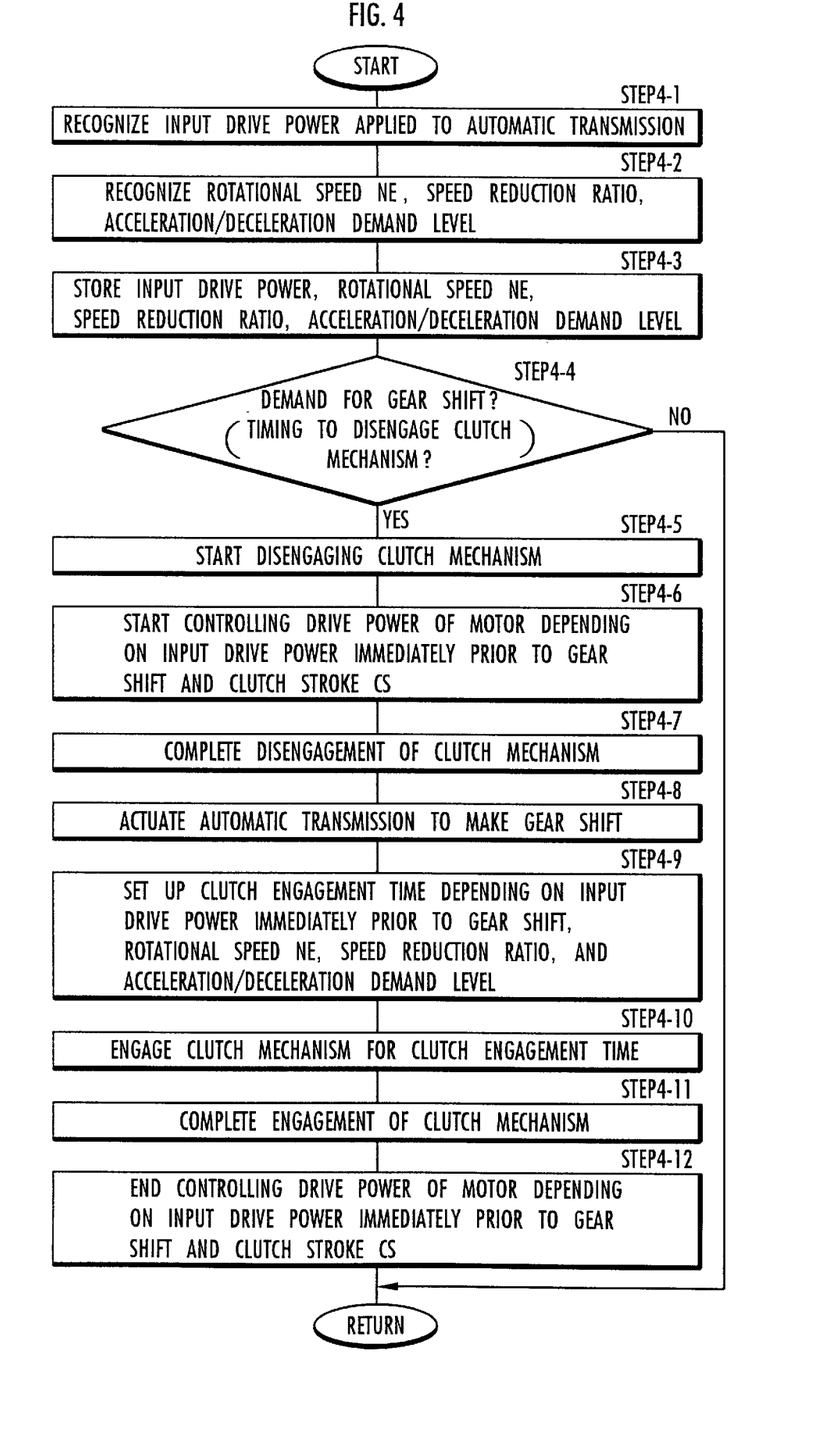
FIG. 4 a flowchart of an operation sequence of the hybrid vehicle according to the second embodiment of the present invention.

As shown in FIG. 4, while the hybrid vehicle is running, the drive power recognizing means 14 sequentially recognizes an input drive power applied to the automatic transmission 4 in STEP4-1.

The controller 10 acquires detected data of the rotational speed NE of the engine 1, and recognizes a speed reduction ratio (one of first through fifth gear positions) of the automatic transmission 4 that is controlled by the transmission control means 12 and a running state required by the driver for the hybrid vehicle in STEP4-2. The running state that is recognized by the controller 10 basically refers to a required level of acceleration/deceleration of the hybrid vehicle (hereinafter referred to as "acceleration/deceleration demand level"). The acceleration/deceleration demand level is represented by a numerical value based on the magnitude, a change, and a rate of change of the accelerator operated quantity AP, and such a numerical value is recognized by the controller 10. For example, if the accelerator operated quantity AP changes more frequently or its change or rate of change becomes large more frequently (when the hybrid vehicle is accelerated/decelerated frequently or needs a large acceleration power), then the acceleration/deceleration demand level is higher. If the accelerator operated quantity AP is relatively small and remains substantially constant for a relatively long period (when the hybrid vehicle is cruising or needs to run in a nearly cruising fashion), then acceleration/deceleration demand level is lower.

The acceleration/deceleration demand level may be recognized on the basis of the opening of the throttle valve (not shown) of the engine 1 depending on the accelerator operated quantity AP, but not directly on the accelerator operated quantity AP.

The controller 10 successively stores data of the input drive power applied to the automatic transmission 4, the rotational speed NE, the speed reduction ratio of the automatic transmission 4, and the acceleration/deceleration demand level thus recognized, in a memory (not shown) in STEP4-3. The controller 10 then determines whether there is a demand for the automatic transmission 4 to make a gear shift, i.e., is it a time to disengage the clutch mechanism 3 for the automatic transmission 4 to make a gear shift, based on the transmission control map of the controller 10 in STEP4-4.

If there is no demand for the automatic transmission 4 to make a gear shift, then the processing in STEP4-1–STEP4-3 is repeated. If there is a demand for the automatic transmission 4 to make a gear shift, then the controller 10 controls the clutch control means 11 to control the clutch actuator 6 to start disengaging the clutch mechanism 3 in STEP4-5.

The controller 10 controls the motor control means 13 to control the drive power of the electric motor 2 depending on the clutch stroke CS that is sequentially detected by the clutch sensor 15 and the input drive power that is recognized by the drive power recognizing means 14 immediately before the clutch mechanism 3 starts being disengaged in STEP4-2, i.e., the input drive power immediately prior to a gear shift, in STEP4-6.

More specifically, the motor control means 13 controls the electric motor 2 as follows: The motor control means 13 determines a corrective coefficient K for adjusting a drive power to be generated by the electric motor 2 from the clutch stroke CS successively detected by the clutch sensor 15 based on a predetermined data table shown in FIG. 5. Basically, the input drive power immediately prior to a gear shift is multiplied by the corrective coefficient K, and the product is determined as a drive power to be applied from the electric motor 2 to the automatic transmission 4. The corrective coefficient K is K=0 at a clutch stroke CS corresponding to the engaged state of the clutch mechanism 3, and K=1 at a clutch stroke CS corresponding to the disengaged state of the clutch mechanism 3. At a clutch stroke CS in a partly engaged state of the clutch mechanism 3 between the engaged and disengaged states thereof, the corrective coefficient K is of a value that gradually increases from "0" to "1" as the clutch mechanism 3 changes from the disengaged state to the engaged state.

Figure 5:
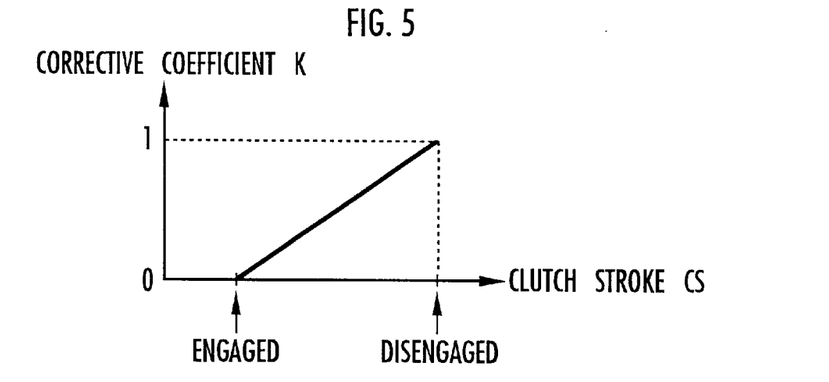
FIG. 5 is a diagram illustrative of the manner in which the hybrid vehicle operates according to the second embodiment of the present invention.

As described above, the motor control means 13 multiplies the input drive power immediately prior to a gear shift by the corrective coefficient K successively determined from the clutch stroke CS for thereby successively determining a target value for the drive power to be applied from the electric motor 2 to the automatic transmission 4, and successively determining a target drive power to be generated by the electric motor 2 from the target value (the input drive power immediately prior to a gear shift×K) and the speed reduction ratio of the rotation transmitting means 5.

Since the corrective coefficient K is determined depending on the clutch stroke CS as described above, the product of the input drive power immediately prior to a gear shift and the corrective coefficient K, i.e., the target value for the drive power to be applied from the electric motor 2 to the automatic transmission 4, is equal to the input drive power immediately prior to a gear shift when the clutch mechanism 3 is disengaged, with no drive power applied from the electric motor 2 to the automatic transmission 4. Therefore, the target drive power for the electric motor 2 when the clutch mechanism 3 is disengaged is such a drive power generated by the electric motor 2 that the drive power applied from the electric motor 2 to the automatic transmission 4 via the rotation transmitting means 4 is equal to the input drive power immediately prior to a gear shift.

When the clutch mechanism 3 is partly engaged (at this time, part of the drive power from the engine 1 is applied to the automatic transmission 4), the product of the input drive power immediately prior to a gear shift and the corrective coefficient K, i.e., the target value for the drive power to be applied from the electric motor 2 to the automatic transmission 4, is smaller than when the clutch mechanism 3 is disengaged as the operating state of the clutch mechanism 3 is closer to the engaged state, i.e., the percentage of the drive power applied from the engine 1 through the clutch mechanism 3 to the automatic transmission 4 is greater.

Therefore, the target drive power for the electric motor 2 when the clutch mechanism 3 is partly engaged is also smaller than when the clutch mechanism 3 is disengaged as the operating state of the clutch mechanism 3 is closer to the engaged state.

In this manner, the motor control means 11 determines the target drive power for the electric motor 2 based on the clutch stroke CS detected from time to time, and enables the regulator/inverter 9 to control the supply of electric energy from the electric energy storage unit 8 to the electric motor 2 in order to cause the electric motor 2 to generate the target drive power.

While the drive power of the electric motor 2 is being thus controlled, when the disengagement of the clutch mechanism 3 is completed in STEP4-7, the transmission control means 12 controls the transmission actuator 7 to actuate the automatic transmission 4 to make a gear shift, i.e., to change speed reduction ratios, according to the transmission control map, in STEP4-8.

Figure 6:
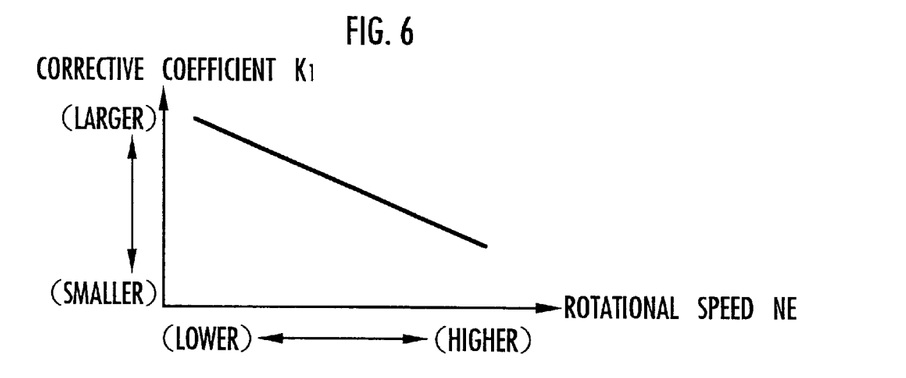
FIG. 6 is a diagram illustrative of the manner in which the hybrid vehicle operates according to the second embodiment of the present invention.

Immediately before a demand for the automatic transmission 4 to make a gear shift is produced, i.e., immediately before the clutch mechanism 3 is disengaged, the controller 10 establishes, in STEP4-9, a clutch engagement time depending on the input drive power applied to the automatic transmission 4 (the input drive power immediately prior to a gear shift) as recognized by the drive power recognizing means 14 in STEP4-1 and the rotational speed NE of the engine 1, the acceleration/deceleration demand level, and the speed reduction ratio of the automatic transmission 4 as recognized in STEP4-2. Specifically, the clutch engagement time is established by the clutch control means 11 as follows:

The clutch control means 11 determines a corrective coefficient K1 for adjusting a clutch engagement time from the rotational speed NE of the engine 1 based on a predetermined data table shown in FIG. 6. Similarly, the clutch control means 11 determines corrective coefficients K2, K3, K4 respectively from the input drive power immediately prior to a gear shift, the acceleration/deceleration demand level, and the speed reduction ratio based on respective predetermined data tables shown in FIGS. 7, 8, and 9.

Figure 7:
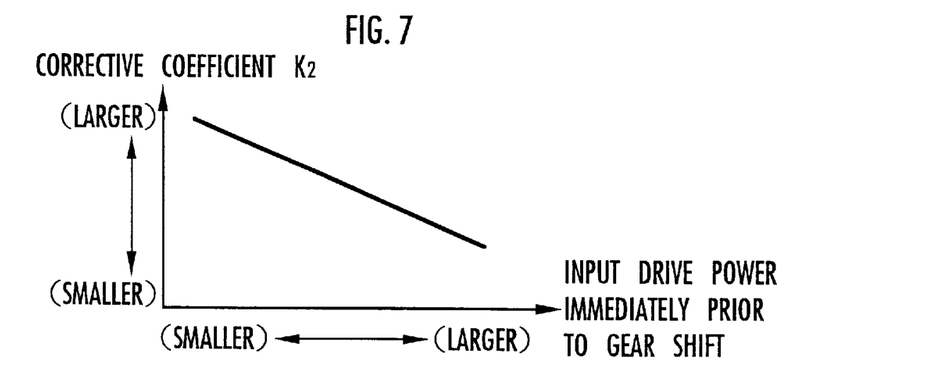
FIG. 7 is a diagram illustrative of the manner in which the hybrid vehicle operates according to the second embodiment of the present invention.
Figure 8:
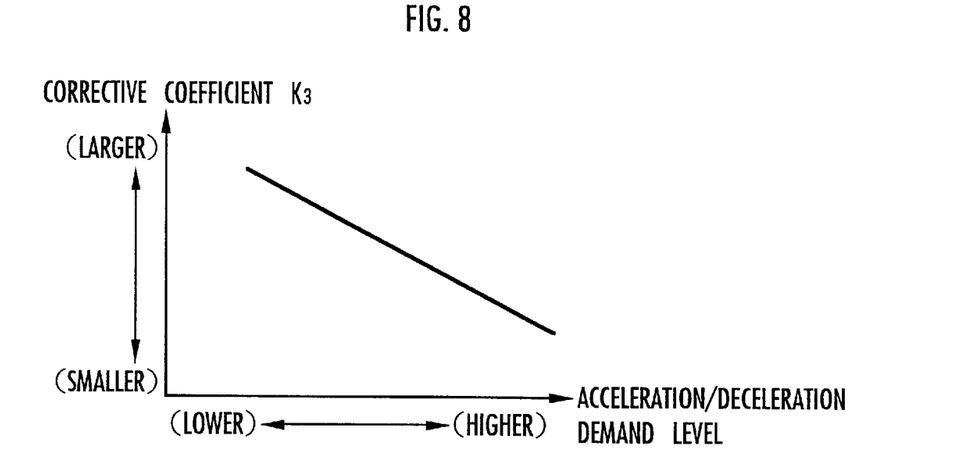
FIG. 8 is a diagram illustrative of the manner in which the hybrid vehicle operates according to the second embodiment of the present invention.
Figure 9:
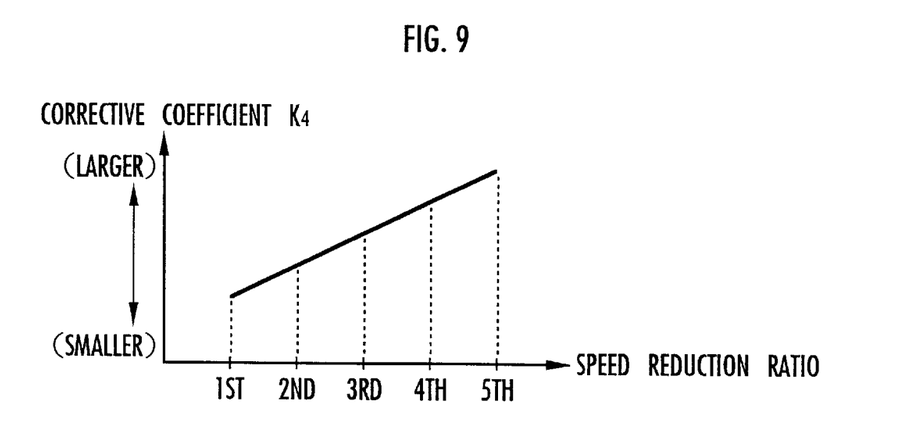
FIG. 9 is a diagram illustrative of the manner in which the hybrid vehicle operates according to the second embodiment of the present invention.

As shown in FIG. 6, the corrective coefficient K1 depending on the rotational speed NE is determined such that the corrective coefficient K1 is greater as the rotational speed NE is lower. As shown in FIG. 7, the corrective coefficient K2 depending on the input drive power immediately prior to a gear shift is determined such that the corrective coefficient K2 is greater as the input drive power immediately prior to a gear shift is smaller. As shown in FIG. 8, the corrective coefficient K3 depending on the acceleration/deceleration demand level is determined such that the corrective coefficient K3 is greater as the acceleration/deceleration demand level is lower (when the hybrid vehicle is needs to run in a nearly cruising fashion). As shown in FIG. 9, the corrective coefficient K4 depending on the speed reduction ratio is determined such that the corrective coefficient K4 is greater as the speed reduction ratio is for a higher speed, i.e., as the gear position is greater.

The clutch control means 11 determines a clutch engagement time by multiplying a predetermined reference time by the corrective coefficients K1–K4 thus determined.

The clutch control means 11 may determine a clutch engagement time immediately after a demand for the automatic transmission 4 to make a gear shift is produced.

After having determined the clutch engagement time, the clutch control means 11 engages the clutch mechanism 3 for the clutch engagement time, thus returning the operating state of the clutch mechanism 3 to the engaged state in STEP4-10. At this time, the clutch control means 11 divides the displacement of the clutch plate (not shown) which is required to change the operating state of the clutch mechanism 3 from the disengaged state to the engaged state, by the determined clutch engagement time, determining a speed at which the clutch mechanism 4 is to be engaged. The clutch control means 11 then engages the clutch mechanism 3 at the determined speed thereby to equalize the time required by the engagement of the clutch mechanism 3 to the clutch engagement time.

The process of controlling the drive power of the electric motor 2, which has started in STEP4-6, is continued even while the clutch mechanism 3 is being engaged. When the engagement of the clutch mechanism 3 is completed, i.e., when the operating state of the clutch mechanism 3 is returned to the engaged state, in STEP4-11, the above controlling of the drive power of the electric motor 2 is ended in STEP4-12.

After the engagement of the clutch mechanism 3 has been completed, the electric motor 2 is controlled to generate an assistive output power or regenerate electric energy depending on how the hybrid vehicle runs.

Since the clutch mechanism 3 should preferably be disengaged as quickly as possible, the time required to disengage the clutch mechanism 3 is set to a short time without being variable as is the case with the clutch engagement time.

When the clutch mechanism 3 is disengaged with no drive power applied from the engine 1 to the automatic transmission 3 in the operation of the hybrid vehicle in connection with a gear shifting operation of the automatic transmission 4, a drive power equivalent to the input drive power which is applied to the automatic transmission 4 immediately before the clutch mechanism 3 starts being disengaged (the input drive power immediately prior to a gear shift) is applied from the electric motor 2 to the automatic transmission 4. When the clutch mechanism 3 is partly engaged while the clutch mechanism 3 is being disengaged or engaged, the drive power of the electric motor 2 is controlled such that the drive power applied from the electric motor 2 to the automatic transmission 4 is smaller than the input drive power immediately prior to a gear shift as the clutch stroke CS is closer to the engaged state of the clutch mechanism and the percentage of the drive power applied from the engine 1 to the automatic transmission 4 is greater.

Specifically, when the clutch mechanism 3 is partly engaged while the clutch mechanism 3 is being disengaged, as the input drive power applied from the engine 1 to the automatic transmission 4 decreases, the drive power of the electric motor 2 and the input drive power applied from the electric motor 2 to the automatic transmission 4 increase. When the clutch mechanism 3 is partly engaged while the clutch mechanism 3 is being engaged, as the input drive power applied from the engine 1 to the automatic transmission 4 increases, the drive power of the electric motor 2 and the input drive power applied from the electric motor 2 to the automatic transmission 4 decrease.

Figure 10:
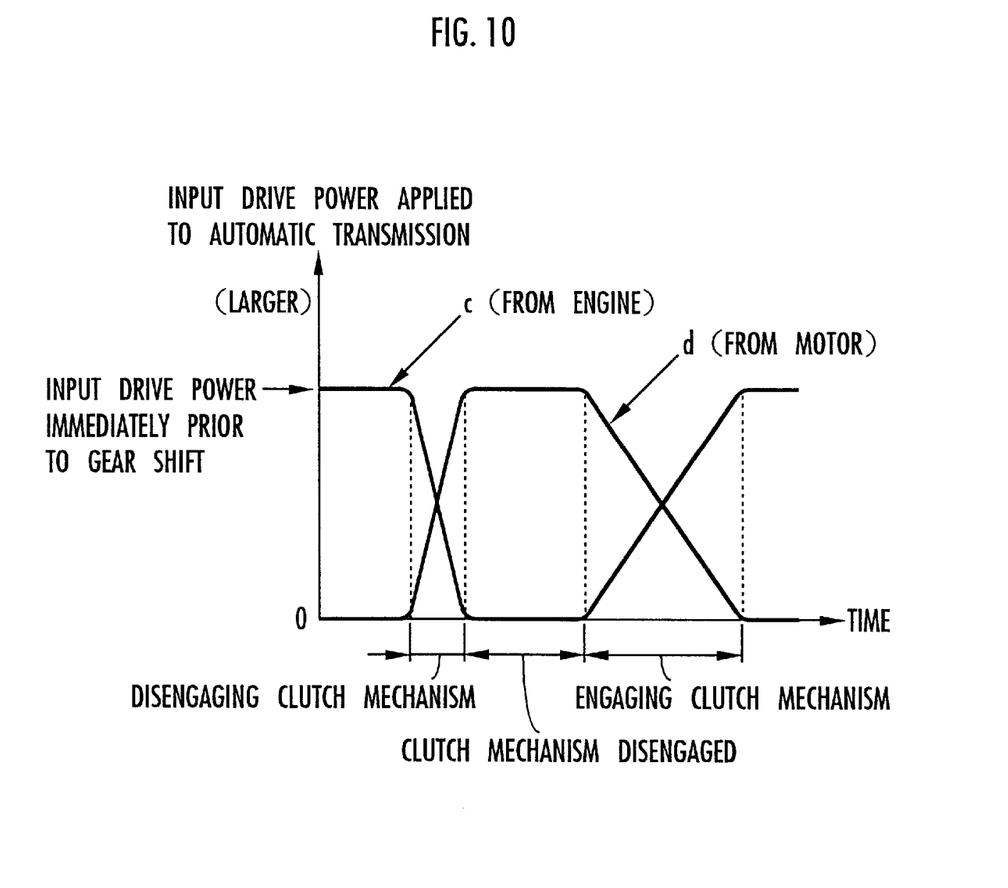
FIG. 10 is a diagram illustrative of the manner in which the hybrid vehicle operates according to the second embodiment of the present invention.

For example, it is assumed that as shown in FIG. 10, the hybrid vehicle runs only with the output power from the engine 1 before a demand is produced for the automatic transmission 4 to make a gear shift. When the clutch mechanism 3 starts being disengaged in response to a demand produced for the automatic transmission 4 to make a gear shift, the input drive power applied from the engine 1 to the automatic transmission 4 decreases as the disengagement of the clutch mechanism 3 proceeds, and drops to "0" when the clutch mechanism 3 is disengaged, as indicated by the solid-line curve "c" in FIG. 10. At this time, the input drive power applied from the electric motor 2 to the automatic transmission 4 increases to make up for the reduction in the input drive power applied from the engine 1 to the automatic transmission 4 as the disengagement of the clutch mechanism 3 proceeds, and is equalized to the input drive power immediately prior to a gear shift when the clutch mechanism 3 is disengaged, as indicated by the solid-line curve "d" in FIG. 10.

When the clutch mechanism 3 starts being engaged, the input drive power applied from the engine 1 to the automatic transmission 4 increases as the engagement of the clutch mechanism 3 proceeds, as indicated by the solid-line curve "c" in FIG. 10. At this time, the input drive power applied from the electric motor 2 to the automatic transmission 4 decreases as the engagement of the clutch mechanism 3 proceeds, as indicated by the solid-line curve "d" in FIG. 10.

In the present embodiment, therefore, after the disengagement of the clutch mechanism 3 starts and until the engagement of the clutch mechanism 3 ends when the automatic transmission 4 makes a gear shift, a constant drive power equivalent to the input drive power immediately prior to a gear shift can be applied to the automatic transmission 4. That is, a constant propulsive drive power can be transmitted to the drive wheels of the hybrid vehicle after the disengagement of the clutch mechanism 3 starts and until the engagement of the clutch mechanism 3 ends. As a result, when the clutch is disengaged for the automatic transmission 4 to make a gear shift, the driver of the hybrid vehicle is prevented from feeling that the vehicle runs idly, and behavioral changes of the hybrid vehicle at the time the automatic transmission 4 makes a gear shift can be reduced for better riding comfort.

When the clutch mechanism 3 is partly engaged while it is being engaged and disengaged, the drive power of the electric motor 2 is controlled depending on the clutch stroke CS for uniformizing the propulsive drive power transmitted to the drive wheels of the hybrid vehicle irrespective of the times required for engaging and disengaging the clutch mechanism 3. Therefore, the times required for engaging and disengaging the clutch mechanism 3 can be set up with increased freedom, and can be varied depending on the driving conditions of the hybrid vehicle.

In the present embodiment, the clutch engagement time, which is the time required to engaging the clutch mechanism 3, is determined, as described above, depending on the input drive power (the input drive power immediately prior to a gear shift) applied to the automatic transmission 4 immediately before a demand is produced for the automatic transmission 4 to make a gear shift, i.e., immediately before the clutch mechanism 3 is disengaged, the rotational speed NE of the engine 1, the acceleration/deceleration demand level, and the speed reduction ratio of the automatic transmission 4. When the automatic transmission 4 makes a gear shift while the hybrid vehicle is not essentially being accelerated or decelerated, but is cruising (at a substantially constant speed) or running in a nearly cruising fashion, the clutch engagement time is set to a relatively long time, allowing the clutch mechanism 3 to be engaged relatively slowly. The relatively long clutch engagement time is effective in reducing undue burdens imposed on the synchromesh mechanism (not shown) of the automatic transmission 4 and shocks produced when the clutch mechanism 3 is engaged, and also in performing a smooth process for engaging and disengaging the clutch mechanism 3 and operating the automatic transmission 4 to make a gear shift.

When the automatic transmission 4 makes a gear shift while the hybrid vehicle is being accelerated and decelerated frequently or accelerated for a much higher speed, the clutch engagement time is set to a relatively short time for engaging the clutch mechanism 3 quickly. As a consequence, the response of the running behavior of the hybrid vehicle is sufficiently achieved.

In the above second embodiment, the time required to disengage the clutch mechanism 3 is not variably established. However, the time required to disengage the clutch mechanism 3 may be variably established depending on the rotational speed NE or the acceleration/deceleration demand level (demanded running pattern) for the hybrid vehicle.

When a demand is produced for the automatic transmission 4 to make a gear shift while the electric motor 2 is regenerating electric energy to apply a drive power to the automatic transmission 4 in a direction to brake the hybrid vehicle (braking torque) during deceleration of the hybrid vehicle, the electric motor 2 may be reversed when the clutch mechanism 3 is disengaged or while the clutch mechanism 3 is being disengaged or engaged, for thereby applying a braking torque, which is equivalent to the braking torque applied to the automatic transmission 4 immediately before the clutch mechanism 3 starts being disengaged, from the electric motor 2 to the automatic transmission 4.

In the first and second embodiments, the electric motor 2 is connected to the input shaft of the automatic transmission 4 via the rotation transmitting means 5. However, the electric motor 2 may be connected directly to the input shaft of the automatic transmission 4 between the clutch mechanism 3 and the automatic transmission 4.

Although certain preferred embodiments of the present invention have been shown and described in detail, it should be understood that various changes and modifications may be made therein without departing from the scope of the appended claims.

What is claimed is:

1. A control system for controlling a hybrid vehicle having an engine for propelling the hybrid vehicle, said engine having an output shaft, an automatic transmission connected to the output shaft of the engine for transmitting an output power of said engine to drive wheels of the hybrid vehicle, clutch means connected between said output shaft of the engine and said automatic transmission, for selectively applying the output power of said engine to said automatic transmission, an electric motor connected to said automatic transmission at an output side of said clutch means for transmitting an assistive output power for assisting the output power of said engine via said automatic transmission to said drive wheels, clutch control means for successively disengaging and engaging said clutch means in response to a demand for said automatic transmission to make a gear shift, and transmission control means for controlling said automatic transmission to make a gear shift when said clutch means is disengaged, said control system comprising:

drive power recognizing means for recognizing a drive power applied to said automatic transmission immediately before said clutch means starts being disengaged when there is a demand for said automatic transmission to make a gear shift; and motor control means for controlling a drive power generated by said electric motor to apply a drive power which is substantially equal to the drive power recognized by said drive power recognizing means, from said electric motor to said automatic transmission when said clutch means is disengaged.

2. A control system according to claim 1, further comprising detecting means for detecting an operated position intermediate between disengaged and engaged states of said clutch means, said motor control means comprising means for controlling the drive power generated by said electric motor depending on the operated position of said clutch means so as to be smaller than the drive power generated by said electric motor when said clutch means is disengaged, as the operated position of said clutch means detected by said detecting means approaches the engaged state of said clutch means.

3. A control system according to claim 2, further comprising engagement time setting means for setting a time required to engage said clutch means from the disengaged state into the engaged state, depending on at least one of said drive power recognized by said drive power recognizing means, a rotational speed of said engine prior to the demand for the automatic transmission to make a gear shift, a speed reduction ratio of said automatic transmission prior to the demand for the automatic transmission to make a gear shift, and a demanded running pattern of the hybrid vehicle prior to the demand for the automatic transmission to make a gear shift, said clutch control means comprising means for engaging said clutch means for said time after the clutch means has been disengaged.

4. A control system according to claim 3, wherein said engagement time setting means comprises means for setting the time required to engage said clutch means depending on said drive power recognized by said drive power recognizing means, such that the time required to engage said clutch means is longer as said drive power recognized by said drive power recognizing means is smaller.

5. A control system according to claim 3, wherein said engagement time setting means comprises means for setting the time required to engage said clutch means depending on said rotational speed of said engine prior to the demand for the automatic transmission to make a gear shift, such that the time required to engage said clutch means is longer as said rotational speed of said engine is lower.

6. A control system according to claim 3, wherein said engagement time setting means comprises means for setting the time required to engage said clutch means depending on said speed reduction ratio of said automatic transmission prior to the demand for the automatic transmission to make a gear shift, such that the time required to engage said clutch means is longer as said speed reduction ratio is for a higher speed.

7. A control system according to claim 3, wherein said engagement time setting means comprises means for setting the time required to engage said clutch means depending on the demanded running pattern of the hybrid vehicle prior to the demand for the automatic transmission to make a gear shift, such that the time required to engage said clutch means is longer when the demanded running pattern requires the hybrid vehicle to cruise at a substantially constant speed than when the demanded running pattern requires the hybrid vehicle to be accelerated and decelerated.

* * * * *